(12) United States Patent
Agrawal et al.

(10) Patent No.: US 11,153,885 B2
(45) Date of Patent: Oct. 19, 2021

(54) MEDIUM-BASED TRANSMISSION PARAMETER ADAPTATION

(71) Applicant: SEMICONDUCTOR COMPONENTS INDUSTRIES, LLC, Phoenix, AZ (US)

(72) Inventors: Abhishek Kumar Agrawal, Fremont, CA (US); Sigurd Schelstraete, Menlo Park, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 144 days.

(21) Appl. No.: 16/703,665

(22) Filed: Dec. 4, 2019

(65) Prior Publication Data
US 2021/0176754 A1 Jun. 10, 2021

(51) Int. Cl.
*H04W 72/04* (2009.01)
*H04W 84/12* (2009.01)

(52) U.S. Cl.
CPC ........ *H04W 72/0493* (2013.01); *H04W 84/12* (2013.01)

(58) Field of Classification Search
CPC .......................... H04W 72/0493; H04W 84/12
See application file for complete search history.

(56) References Cited

U.S. PATENT DOCUMENTS

| | | | |
|---|---|---|---|
| 2013/0250882 A1* | 9/2013 | Dinan | H04L 5/0032 370/329 |
| 2014/0010169 A1* | 1/2014 | Novak | H04W 72/085 370/329 |
| 2018/0027573 A1* | 1/2018 | Cariou | H04W 72/085 370/329 |
| 2018/0048498 A1* | 2/2018 | Stern-Berkowitz | H04L 5/0048 |

\* cited by examiner

*Primary Examiner* — Mohammad S Anwar
(74) *Attorney, Agent, or Firm* — Maschoff Brennan (57) ABSTRACT

An example method may include obtaining default transmitting parameters and potential variations of the default transmitting parameters for a packet to be transmitted over a wireless network. The method may also include obtaining medium state information for a medium of the wireless network. The method may additionally include generating a first candidate of transmitting parameters and a second candidate of transmitting parameters based on the medium state information, where each of the first and second candidates of transmitting parameters are consistent with at least one of the default transmitting parameters and the potential variations of the default transmitting parameters. The method may also include selecting from among the first and the second candidates of transmitting parameters to use when transmitting the packet over the wireless network.

20 Claims, 8 Drawing Sheets

MEDIUM-BASED TRANSMISSION PARAMETER ADAPTATION

FIELD

The implementations discussed herein are related to medium-based transmission parameter adaptation, and in particular, to improved usage of radio frequency (RF) medium by adapting transmission parameters.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device or station (STA) utilizing the WLAN.

However, when communicating, certain aspects of the RF medium (sometimes shortened to medium) may be used inefficiently.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to management of transmission parameters to adapt to a state of the medium. Some implementations provide a method, system, and/or apparatus to facilitate management of transmission parameters to adapt to the state of the medium.

An example method may include obtaining default transmitting parameters and potential variations of the default transmitting parameters for a packet to be transmitted over a wireless network. The method may also include obtaining medium state information for a medium of the wireless network. The method may additionally include generating a first candidate of transmitting parameters and a second candidate of transmitting parameters based on the medium state information, where each of the first and second candidates of transmitting parameters are consistent with at least one of the default transmitting parameters and the potential variations of the default transmitting parameters. The method may also include selecting from among the first and the second candidates of transmitting parameters to use when transmitting the packet over the wireless network.

The invention may be implemented in hardware, firmware, or software.

Associated devices and circuits are also claimed.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations thereof which are illustrated in the appended drawings. It is appreciated that these drawings depict only typical implementations of the invention and are therefore not to be considered limiting of its scope. The invention will be described and explained with additional specificity and detail using the accompanying drawings in which.

DETAILED DESCRIPTION OF SOME EXAMPLE IMPLEMENTATIONS

Implementations described herein may generally include an approach to facilitate medium-based transmission parameter adaptation. For example, transmission parameters may be adapted or modified to utilize the medium more efficiently.

Wireless transmission medium, or RF medium may be accessed in two dimensions, (i) frequency range/bandwidth, and (ii) time duration. When multiple devices are accessing a shared medium, it is important that collisions be avoided, e.g., that the same spectrum is not used at the same time. To avoid collisions, devices observe the medium before starting a transmission and follow a set of rules specified by various standards to avoid collisions.

In some circumstances, devices may utilize clear channel assessment-carrier sense (CCA-CS), CCA-energy detect (CCA-ED), network allocation vector (NAV) analysis, and/or CCA-received signal strength indicator (CCA-RSSI) to facilitate determination of medium availability for transmission, whether immediately or whether some time will pass before it is available.

According to the present disclosure, the medium state information may be used to generate candidate transmitting parameters for a given packet, and based on the medium availability and former success rates in transmitting packets with different transmitting parameters, a particular set of transmitting parameters may be selected to transmit the given packet. For example, if a first access point (AP) is transmitting in a secondary 20 MHz band, and a second AP seeks to transmit using 80 MHz bandwidth, the second AP may intelligently select transmitting parameters to increase throughput. For instance, rather than waiting until the first AP was done transmitting in the secondary 20 MHz band, the second AP may adjust the transmitting parameters of the packet to start transmitting in the primary 20 MHz band and in the full 80 MHz after the first AP has completed its transmission. By using such intelligent selection of transmitting parameters consistent with some embodiments of the present disclosure, network throughput may be improved. Such improvements may reduce overall network traffic, may decrease backlog and transmission delays, and may improve network speeds observed by consumers using wireless networks. Additionally, the improvements therein may facilitate improved network functionality in crowded network spaces, such as apartment buildings and high-rise buildings with multiple overlapping wireless networks.

Reference will now be made to the drawings to describe various aspects of example implementations of the invention. It is to be understood that the drawings are diagrammatic and schematic representations of such example implementations, and are not limiting of the present invention, nor are they necessarily drawn to scale.

Figure 1:
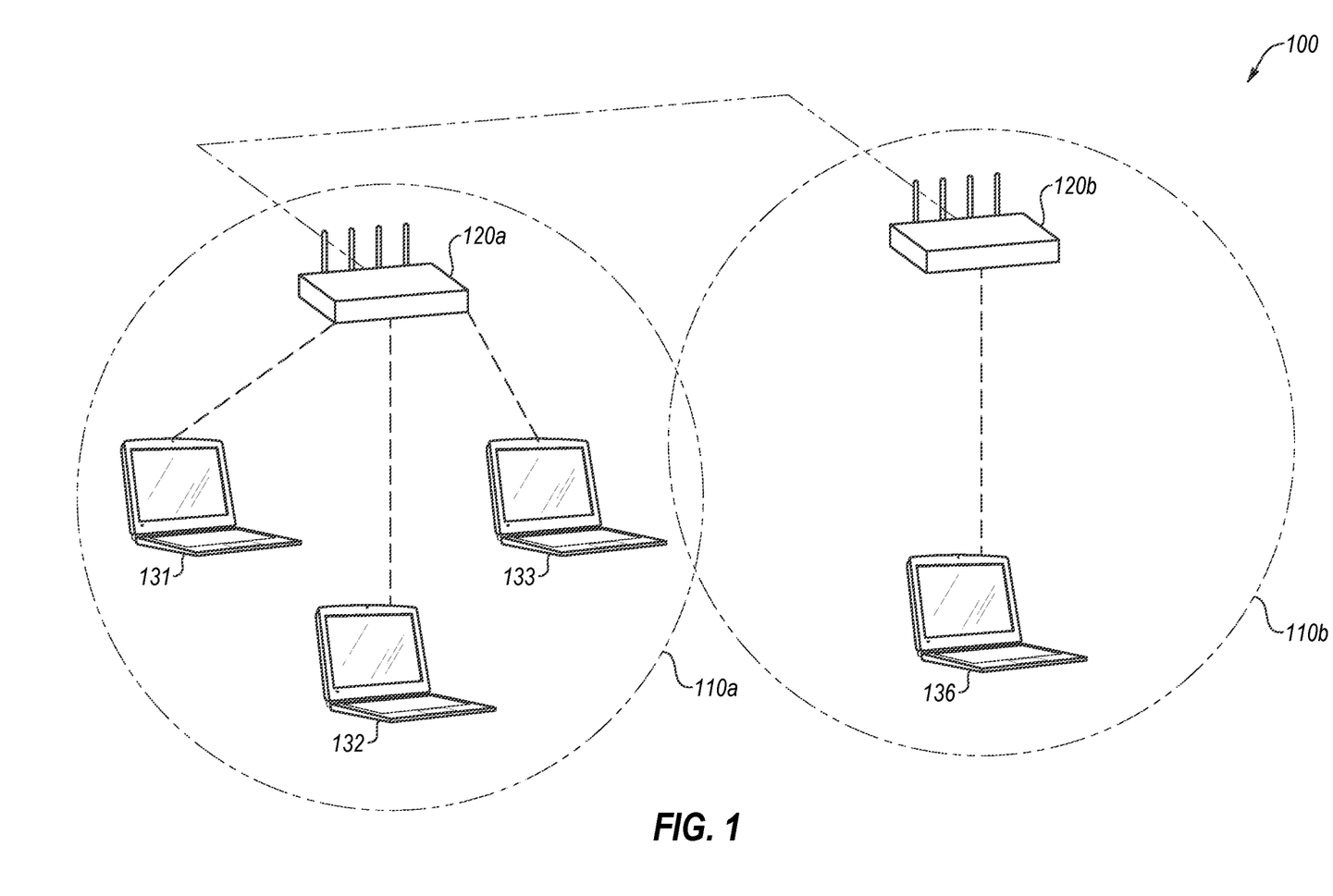
FIG. 1 illustrates an example system within which medium-based transmission parameter adaptation may be implemented.

FIG. 1 illustrates an example environment 100 within which medium-based transmission parameter adaptation may be implemented, in accordance with one or more embodiments of the present disclosure. The environment 100 illustrates two base service sets (BSSs) 110, including the BSS 110*a* and 110*b*. The BSS 110*a* includes an access point (AP) 120*a* and three stations (STAs) 131, 132, and 133, where the AP 120*a* and the STAs 131, 132, and 133 all wirelessly communicate with each other. The BSS 110*b* includes an AP 120*b* and a STA 136, where the AP 120*b* and the STA 136 wirelessly communicate with each other.

In operation, the devices in the BSS 110*a* may utilize portions of the RF medium that the BSS 110*b* may desire to use, and vice versa. For example, both BSSs 110 may be on a similar channel or frequency. In these and other embodiments, depending on the amount of interference between the two BSSs 110, the communication bandwidth may be reduced as the devices of the BSS 110*a* may be forced to wait while a device from the BSS 110*b* finishes communicating before the devices of the BSS 110*a* can use the medium to transmit, and vice versa. In some embodiments, depending on the broadcast strength of the different BSSs 110, the media may be available if the detected power for an inter-BSS packet is above one threshold, and a different threshold for intra-BSS packets. For example, if the AP 120*a* in the BSS 110*a* is waiting to transmit due to perceived signal from the STA 131 transmitting (intra-BSS), one threshold level of signal strength may be observed before the AP 120*a* may transmit. Similarly, if the AP 120*a* in the BSS 110*a* is waiting to transmit due to perceived signal from the AP 120*b* transmitting (inter-BSS), another threshold level of signal strength may be observed before the AP 120*a* may transmit.

In these and other embodiments, by using medium-based transmission parameter adaptation, the transmission parameters for a given transmission may be modified based on the medium availability such that the medium may be used more efficiently. For example, if certain bandwidth bands are not used by the BSS 110*b*, in some circumstances those bandwidth bands may be used by the BSS 110*a* at an earlier time than currently permitted, providing an increase in efficiency and overall medium usage. Various examples are provided herein, such as those illustrated and described with reference to FIGS. 2-6.

Figure 8:
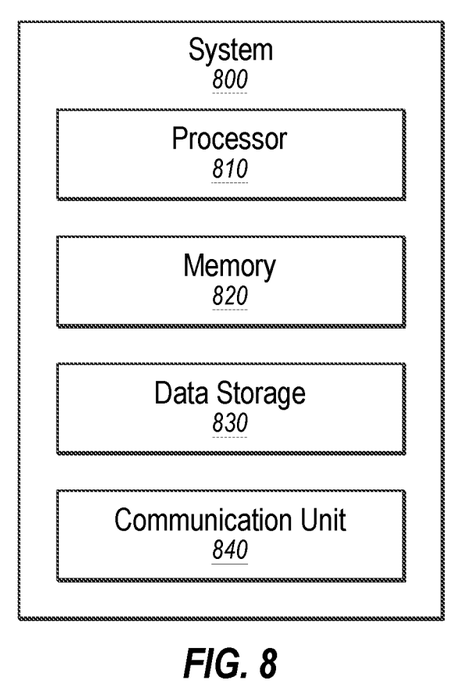
FIG. 8 illustrates an example computing device, all arranged in accordance with at least one implementation described herein.

The APs 120 (such as the APs 120*a* or 120*b*) may include a gateway, a repeater, a mesh node, and/or other suitable access point for wireless stations or devices such as the STAs 131-136. The APs 120 may connect to the Internet and/or a core network via a bridge, a backhaul link, a base station, and/or other suitable devices or connections. One example implementation of the APs 120 as a computing device is illustrated in FIG. 8.

Each of the STAs 131-136 may generally include any device that has the capability to wirelessly connect to the APs 120 according to any of the 802.11 standards or other suitable wireless standard. Each of the 131-136 may include a desktop computer, a laptop computer, a tablet computer, a mobile phone, a smartphone, a personal digital assistant (PDA), a smart television, or any other suitable wireless station. One example implementation of the STAs 131-136 as a computing device is illustrated in FIG. 8.

Modifications, additions, or omissions may be made to the environment 100 without departing from the scope of the present disclosure. For example, the designations of different elements in the manner described is meant to help explain concepts described herein and is not limiting. Further, the environment 100 may include any number of other elements or may be implemented within other systems or contexts than those described. For example, any number of BSSs 110 may be included, each including any number of APs 120 and/or STAs. Additionally, as the number of BSSs 110 increases, the value of the present disclosure becomes higher as the potential delay becomes longer as the number of potentially interfering BSSs 110 increases.

Figure 2:
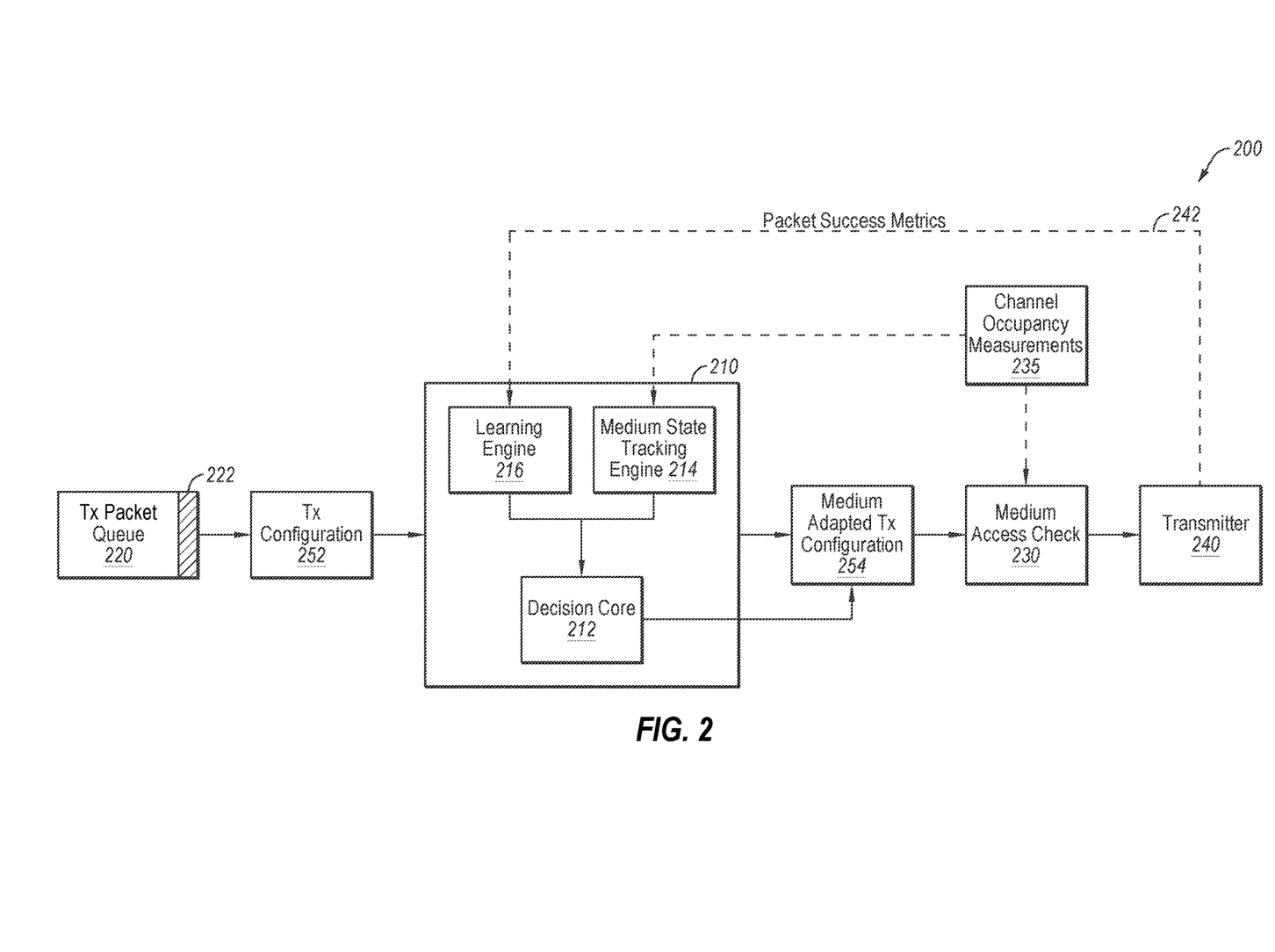
FIG. 2 illustrates an example schematic representation of a system implementing medium-based transmission parameter adaptation.

FIG. 2 illustrates an example schematic representation of a system 200 implementing medium-based transmission parameter adaptation, in accordance with one or more embodiments of the present disclosure. The system 200 may include a transmit scheduler 210 that may include a decision core 212, a medium state tracking engine 214, and a learning engine 216. The system 200 may include a transmit packet queue 220, a medium access checker 230, and a transmitter 240. In some embodiments, the system 200 may be an AP (such as the APs 120*a*/120*b* of FIG. 1), a STA (such as the STAs 131-136 of FIG. 1), and/or any device configured to transmit information wirelessly.

In operation, the transmit scheduler 210 may obtain a transmit configuration 252 for a first packet 222 in the transmit packet queue 220. Using a state of the medium as determined by the medium state tracking engine 214 by analyzing channel occupancy measurements 235, the medium state tracking engine 214 may determine a set of candidate transmitting parameters that may be used when transmitting the packet 222. Using previous success or failures from the learning engine 216, the decision core 212 may select one of the set of transmitting parameters as a medium adapted transmission configuration 254 according to which the packet 222 may be transmitted. The accessibility of the medium may be checked by the medium access checker 230, and if the medium is available, the packet 222 may be transmitted via the transmitter 240 according to the medium adapted transmit configuration 254.

The transmit packet queue 220 may include any storage location or component on a device, whether logical or physical, in which packets may be stored or otherwise temporarily held in preparation of transmission. The transmit packet queue 220 may be organized and ordered in any manner, and for the purposes of this disclosure, any such organization and/or ordering is contemplated within the scope of the present disclosure. The first packet 222 may be the next packet to be transmitted via the transmitter 240. The packets in the transmit packet queue 220 may include or may be otherwise stored in conjunction with a transmit configuration 252 for the first packet 222. For example, the transmit configuration 252 for the first packet 222 may designate parameters such as the bandwidth, duration, and power requirements via which the first packet 222 may be transmitted. In some embodiments, the transmit configuration 252 for the first packet 222 may be a default transmit configuration for the entire system 200, for a group or range of packets, etc., rather than being specific to the first packet 222.

The medium state tracking engine 214 of the transmit scheduler 210 may be any system, component, or device that is able to detect, monitor, or otherwise obtain the channel occupancy measurements 235. In some embodiments, the same components that implements the medium access checker 230 may implement the medium state tracking engine 214. For example, the same components may be used to obtain the channel occupancy measurements 235 which may be used both to generate candidate sets of transmitting parameters by the medium state tracking engine 214 and to determine whether the medium is available for transmission by the medium access checker 230. To obtain the channel occupancy measurements 235, the medium state tracking engine 214 may determine current medium occupancy information and/or future medium occupancy information, which may be determined on a per sub-band basis. Additionally or alternatively, the medium state tracking engine 214 may obtain received signal strength indicator (RSSI).

To determine the current medium occupancy information, the system 200 may observe, generate, or follow or otherwise obtain, for example, CCA-CS and/or CCA-ED indications. For CCA-CS indications, the system 200 may detect and decode a WiFi preamble at a received power level of at least a minimum coding and/or modulation rate sensitivity (e.g., −82 decibel-milliwatts (dBm)), and from the physical layer convergence protocol (PLCP) header field, may determine the time duration for which the medium will be occupied and may indicate the medium as busy during that time duration. For CCA-ED indications, the system 200 may detect non-WiFi energy in the operating channel, and if it is at a sufficient level (e.g., 20 dB above the minimum sensitivity of the CCA-CS, such as −82+20=−62 dBm), may recognize the medium as busy.

To determine the future medium occupancy information, the system 200 may observe, generate, follow or otherwise obtain, for example, NAV indications. For NAV indications, the system 200 may read the duration field from a media access control (MAC) header of received packets. The duration field in the MAC header may indicate how long the currently transmitting device intends to hold the medium busy.

To determine the RSSI, the system 200 may observe, generate, follow or otherwise obtain, a relative signal strength of incoming wireless signals. In some embodiments, the relative values may be set by the antenna, radio, or other chip-set manufacturer. In these and other embodiments, the relative value may provide information regarding whether the medium is busy (e.g., with a high RSSI) or whether the medium is available (e.g., with a low RSSI).

The decision core 212 may represent the decision-making system, device, or component that selects which transmission parameters are to be used to transmit the packet 222. The decision core 212 may be configured to read or otherwise obtain the transmit configuration 252 for the first packet 222, and may read or otherwise obtain the ranges within which those parameters may be varied (e.g., a packet may be transmitted at a range of different bandwidths and different modulation and coding scheme (MCS) levels).

In some embodiments, the decision core 212 may obtain a list of candidate transmission parameters that may be available to transmit the first packet 222 based on the channel occupancy measurements 235 obtained by the medium state tracking engine 214. Using that information, the decision core 212 may generate the set of candidate transmitting parameters from which the decision core 212 may select how the first packet 222 is to be transmitted. For example, if a packet has a maximum transmission bandwidth of 80 MHz (for example, because the system 200 is configured as such) and the medium state tracking engine 214 indicates that the secondary 40 MHz is to be busy for a time t, two candidate transmission parameters may include (a) use 40 MHz bandwidth and begin transmission immediately, or (b) use 80 MHz bandwidth and delay transmission until after time t. Any number of parameters may be included in the transmission modes, and any number of potential transmission modes may be provided. For example, the transmission parameters may include any of a packet bandwidth (including 20 MHz, 40 MHz, 80 MHz, 160 MHz, etc.), packet sub-band puncturing (e.g., whether or not the packet 222 and/or the system 200 is able to be transmitted using sub-band puncturing), packet transmission power (e.g., different power options for spatial reuse), packet MCS (e.g., MCS levels that may vary to be consistent with the other parameters and/or to increase successfulness of transmission), packet length (e.g., divide the packet 222 into a short packet in the 20 MHz bandwidth combined with a longer packet when the full bandwidth is available, or keep the packet 222 as a single larger packet), packet transmit time instant (e.g., immediate transmission or delay transmission for a period of time t), use of request to send/clear to send (RTS/CTS) (e.g., whether or not the packet 222 and/or the system 200 is set to use RTS/CTS in sending packets), MU/SU capabilities (e.g., whether the system 200 is capable of operating in multi-user (MU) multi-input, multi-output (MU-MIMO), single-user (SU)-MIMO, or neither), etc., or any combinations thereof. In some embodiments, a set of transmission parameters may include a value for each of a set group of parameters consistent across all packets within the system 200 and/or the environment within which the system 200 operates (e.g., within the environment 100 of FIG. 1).

In some embodiments, the decision core 212 may identify which of the candidate transmission parameters is likely to be successful in transmitting the packet 222 and output them as the medium adapted transmission configuration 254. For example, the decision core 212 may look at historical success rates (e.g., from the learning engine 216) of transmitting packets using a given candidate set of transmission parameters. As another example, the decision core 212 may select the candidate set of transmission parameters that is most efficient (e.g., most likely to transmit the packet 222 the soonest and/or utilize the maximum amount of the medium).

The learning engine 216 of the transmit scheduler 210 may be any system, component, or device that is able to detect, monitor, or otherwise obtain the packet success metrics 242, or otherwise obtain information to facilitate insight into the potential successfulness of the various candidate transmission parameters. For example, the learning engine 216 may track which of the candidate transmission parameters were selected by the decision core 212 as the medium adapted transmission configuration 254 and monitor via the transmitter 240 whether or not the packet 222 was received successfully (e.g., whether or not an acknowledgment (ACK) was sent in response to the packet 222). In these and other embodiments, over time, the learning engine 216 may provide insight into the effectiveness of certain candidate transmitting parameters. For example, if one of the candidate transmission parameters repeatedly uses spatial overlap to be more efficient, but the packets fail half of the time when spatial overlap is used, the decision core 212 may avoid utilizing spatial overlap, even though it is an option that theoretically may be more efficient. In some embodiments, the decision core 212 may compare a success rate (e.g., 25% failure rate) with an efficiency gain (e.g., 15% more efficient gain in medium usage), and may select whether or not to utilize the candidate transmitting parameters based on if the efficiency gains are overcome by the failure rate (e.g., if the system 200 would use the medium less efficiently because of the failure and required retransmission, despite the increased efficiency when successful). Additionally or alternatively, the decision core 212 may utilize even a low-success rate candidate transmitting parameter if the low success-rate candidate is utilizing un-used or dead space in the medium.

The medium access checker 230 may include any system, device, component, executing algorithms or programs, or combinations thereof able to monitor, sense, or otherwise observe a current status of the medium and provide a decision of whether or not the medium is accessible to be used for transmission. For example, the medium access checker 230 may include an antenna or other device capable of receiving wireless signals associated with the medium in conjunction with a program or process that indicates whether the observed wireless signals indicate that the medium is available, such as an antenna that obtains the channel occupancy measurements 235. In some embodiments, the medium access checker 230 may make a decision based on a signal strength of a detected signal at certain frequency ranges in the medium (e.g., if the packet being transmitted is to be transmitted in a primary 20 MHz bandwidth range and the medium is only used in a secondary 40-80 MHz bandwidth range, the medium access checker 230 may indicate the medium is available). Additionally or alternatively, the medium access checker 230 may monitor for and/or make a decision based on receiving an RTS signal. In some embodiments, the medium access checker 230 may operate in a similar manner to other or conventional checkers that determine whether or not the medium is available for transmission. However, as illustrated in FIG. 2, the parameters for transmission against which the medium access checker 230 is checking may be based on the intelligent selection of the transmit scheduler 210.

The channel occupancy measurements 235 may include any number or type of parameters that may indicate a current status of the medium. For example, the channel occupancy measurements 235 may include any of bandwidth availability (e.g., is the 0-20 MHz, 20-40, 40-60 and/or 60-80 MHz bandwidths available), duration (e.g., is the medium available for the next 50 ms), power (e.g., is the medium constrained such that only limited power may be used (e.g., due to spatial reuse)), etc. Such information may be monitored independently for different channels, bandwidth strengths, bands, etc.

The transmitter 240 may include any system, device, component, executing algorithms or programs, or combinations thereof able to transmit packets over the medium. For example, the transmitter 240 may include an antenna or other to transmit wireless signals over the medium. In some embodiments the transmitter 240 may also be configured to provide information regarding the success or failure of transmission of a packet, e.g., via reception of an ACK packet in response to the transmitted packet. Such information regarding success or failure may be provided to the learning engine 216 as packet success metrics 242.

Modifications, additions, or omissions may be made to the system 200 without departing from the scope of the present disclosure. For example, the designations of different elements in the manner described is meant to help explain concepts described herein and is not limiting. Further, the system 200 may include any number of other elements or may be implemented within other systems or contexts than those described. For example, any number of packet queues may be included if there are multiple transmitters and/or operate to send multiple packets simultaneously.

FIGS. 3A, 3B, 5, and 6 illustrate examples of application of the transmit scheduler 210. These examples are in no way limiting, but merely serve to illustrate the improvements in efficiency that may be achieved using the present disclosure. Each of these examples will be described with reference to a first AP (AP1) which is potentially equipped with a transmit scheduler consistent with the present disclosure and a second AP (AP2), both seeking to utilize the medium. While these examples illustrated two APs, it will be appreciated that the same principles are readily extendible to any number of APs seeking to utilize the medium. Transmissions involving AP1 are illustrated with dashed hashmarks, and those involving AP2 are illustrated with solid hashmarks and labeled as AP2.

Figure 3A:
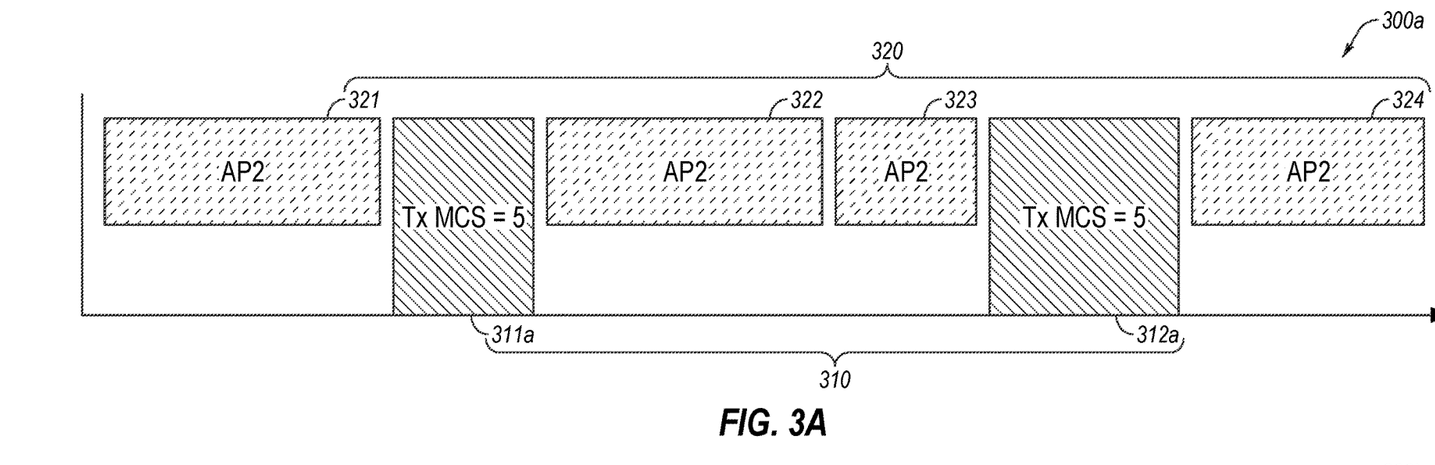
FIGS. 3A and 3B illustrate comparative plots of frequency sub-bands over time depicting one example usage of medium-based transmission parameter adaptation.
Figure 3B:
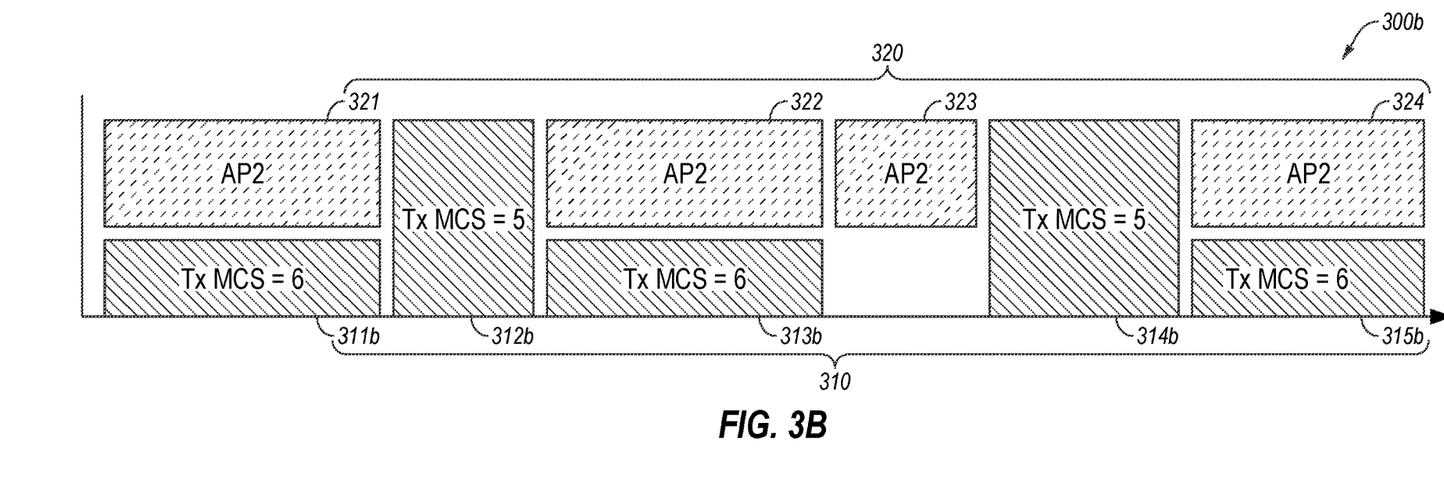
Figure 4:
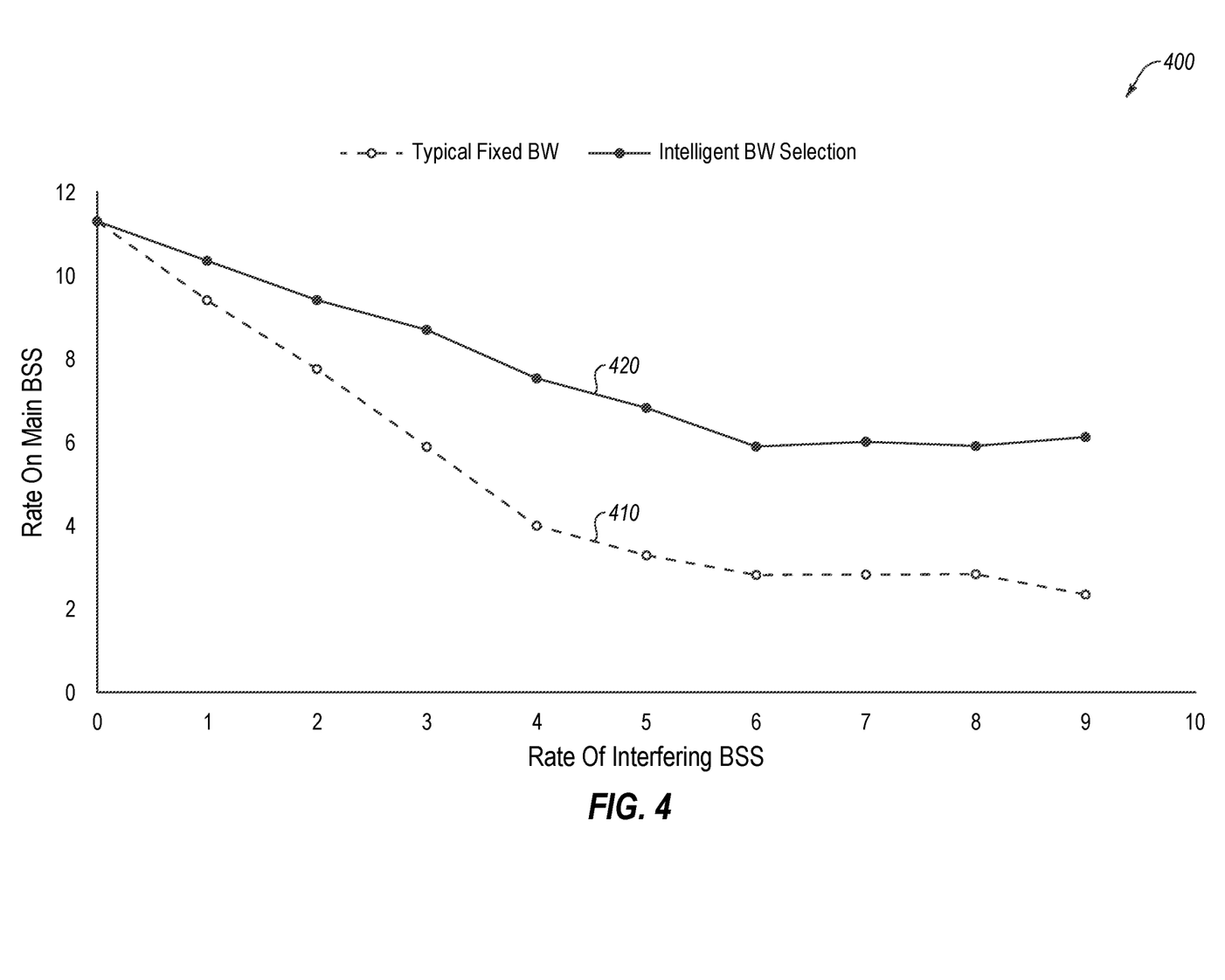
FIG. 4 is a plot of throughput when using medium-based transmission parameter adaptation compared to typical medium usage when an interfering basic service set (BSS) and a BSS are both attempting to use the medium, for example, as illustrated in FIGS. 3A and 3B.

FIGS. 3A and 3B illustrate comparative plots 300a and 300b, respectively, of frequency sub-bands over time depicting one example usage of medium-based transmission parameter adaptation, in accordance with one or more embodiments of the present disclosure. FIG. 3A illustrates an example in which the transmit scheduler is not used, and FIG. 3B illustrates an example in which the transmit scheduler is used. FIG. 4 illustrates a graphical comparison of the rates of interference observed in FIGS. 3A vs. 3B. In FIGS. 3A and 3B, the AP1 may seek access to the medium for an 80 MHz packet transmission to a station while the AP2 in an overlapping BSS (OBSS) may be transmitting in the secondary 40 MHz channel at a level that can be detected by the AP1.

As illustrated in FIG. 3A, the access point AP2 may transmit or otherwise occupy the media with transmissions 320. For example, at 321, 322, 323, and 324, the AP2 may occupy the secondary 40 MHz range of bandwidth. In such a circumstance, the AP1 may wait and then transmit at intervals when the AP2 no longer detects signal transmission from the AP2. For example, the transmission 311a may be transmitted between the transmissions 321 and 322 when the medium is not in use, and the transmissions 312a may be transmitted between the transmissions 323 and 324 using a transmit MCS level of 5.

When the AP1 uses a transmit scheduler, as illustrated in FIG. 3B, the transmit scheduler may identify three potential transmission options for the 80 MHz transmission. First, the AP1 may lower the bandwidth for the transmission to 40 MHz and send the packet immediately any time the medium is free in the primary 40 MHz band (e.g., immediately as the primary 40 MHz band is available for the foreseeable future). Second, the AP1 may break the packet in two different packets with the first part sent in in lower 40 MHz bandwidth immediately while the AP2 is still transmitting, and the second part in the full 80 MHz bandwidth after the AP2 transmission is over. Third, the AP1 may multiplex the downlink transmission in two 40 MHz sub-bands of an 80 MHz Orthogonal Frequency Division Multiple Access (OFDMA) packet but with the secondary 40 MHz transmission power reduced to comply with the spatial reuse requirements while the AP2 is using the secondary 40 MHz sub-band. In such an option, the AP1 may determine which stations receiving the transmission may be more tolerant to disturbances in the secondary 40 MHz sub-band (e.g., because they are closer to the API, etc.).

The medium state tracking engine of the transmit scheduler may observe and/or otherwise obtain channel occupancy information for each of the sub-bands and may evaluate current and/or future availability of each sub-band. Using that data, the decision core may determine which of the three options may increase throughput and may have a high likelihood of success (e.g., based on information from the learning engine 216). In some embodiments, after selecting the appropriate option (and/or as part of the decision-making in selecting the appropriate option), the decision core may select an appropriate MCS level for the transmission, for example, based on bandwidth used, power used, packet length, etc.

For the sake of illustration and as illustrated in FIG. 3B, the decision core may select the second option described above (e.g. breaking the packet into two parts with the first sent with a lower bandwidth immediately and the second part sent when the full bandwidth is available). The AP1, using the second option, may lower the bandwidth of the packet to 40 MHz and reduce the packet length such that the transmission may begin immediately with the transmission 311b at MCS level 6. The packet length of the AP2 may be derived such that AP1 can utilize the full 80 MHz bandwidth as soon as the AP2 transmission is finished (as illustrated by the transmission 312b at MCS level 5). When the AP2 begins transmission again at the transmission 322, the AP1 may again utilize a lower bandwidth 40 MHz packet. However, when the AP2 has the transmission 323, the AP1 may recognize that the transmission length of the transmission 323 is short, and as such, it is more efficient to wait until the entire 80 MHz bandwidth may be used for the transmission 314b, rather than splitting the packet and beginning transmission at the reduced 40 MHz bandwidth for such a short time. When the AP2 is sending the transmission 324, the AP1 again utilizes the reduced 40 MHz bandwidth and the MCS level 6 for the transmission 315b.

As illustrated in FIG. 4, the AP1 uses the medium more efficiently when using a transmit scheduler consistent with the present disclosure. For example, FIG. 4 illustrates the throughput for a typical fixed bandwidth AP 410 compared to the throughput for an intelligent bandwidth selection 420 consistent with the present disclosure. As can be observed in FIG. 4, as the rate of transmission of the interfering BSS increases from left to right, the throughput on the main BSS experiences a sharp decline in rate for 410. In contrast, for 420, the decline in throughput is much more gradual with a significant retention of throughput.

Figure 5:
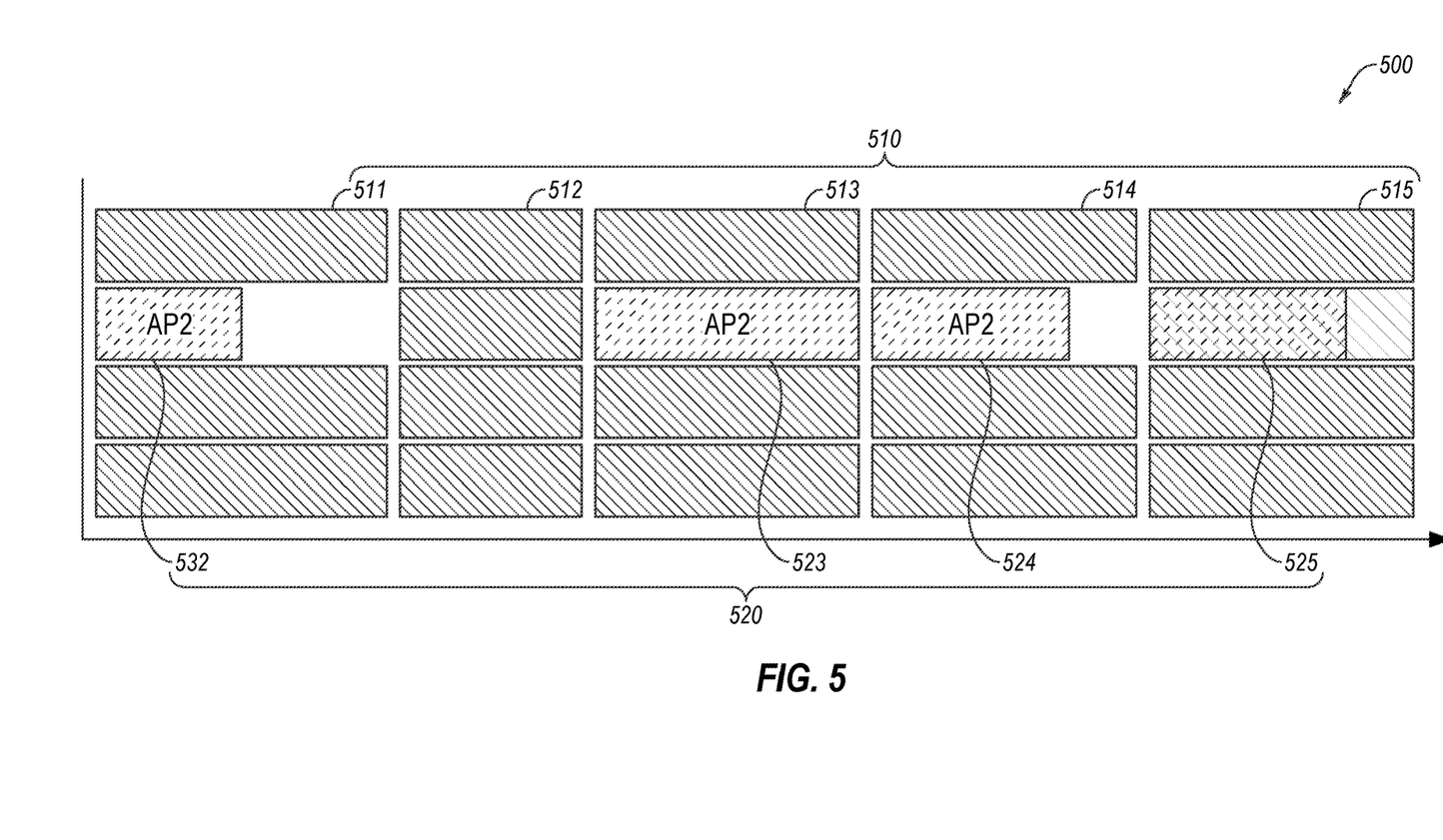
FIG. 5 is a plot of frequency sub-bands over time depicting another example usage of medium-based transmission parameter adaptation.

FIG. 5 is a plot 500 of frequency sub-bands over time depicting another example usage of medium-based transmission parameter adaptation, in accordance with the present disclosure. As illustrated in FIG. 5, the AP1 may be communicating with multiple stations with 802.11ax capabilities (e.g., stations with which sub-band puncturing may be available) using 80 MHz bandwidth, and the AP2 may be transmitting 20 MHz bandwidth packets in one of the non-primary 20 MHz sub-bands. For example, as illustrated in FIG. 5, the AP2 may send transmissions 520, including the transmissions 522, 523, 524, and 525.

The transmit scheduler may identify multiple potential options for transmitting packets to the stations. First, the AP1 may maintain the current packet transmission mode (e.g., a full 80 MHz bandwidth), which would require waiting until the entire 80 MHz bandwidth is available. Second, the AP1 may transmit the current packet with the busy sub-band punctured. Third, the AP1 may multiplex the data such that the transmission includes reduced power in the busy sub-band and full power in the other sub-bands. For the third option, the option may be avoided if the station is not close enough to successfully receive the packets at the reduced transmission power (e.g., by monitoring previous successes of transmitting packets to the particular station at reduced power, etc.).

As illustrated in FIG. 5, the transmit scheduler may select a particular option for each packet as it comes to the front of the queue for transmission. For example, a first packet may be transmitted via the transmission 511 using the second option (e.g., sub-band puncturing) for a station that is a further distance away from the AP1. Continuing the example, a second packet may be transmitted using the full 80 MHz bandwidth when the AP2 is no longer using the medium with the transmission 412. The transmissions 513 and 514 may be similarly handled as the transmission 511. For the transmission 515, the transmit scheduler may determine that the station to receive the packet is close enough to utilize spatial reuse with a reduced power in the busy sub-band, and so may select the third option and the transmission 515 may utilize the full 80 MHZ, but with reduced transmission power in the busy sub-band.

Figure 6:
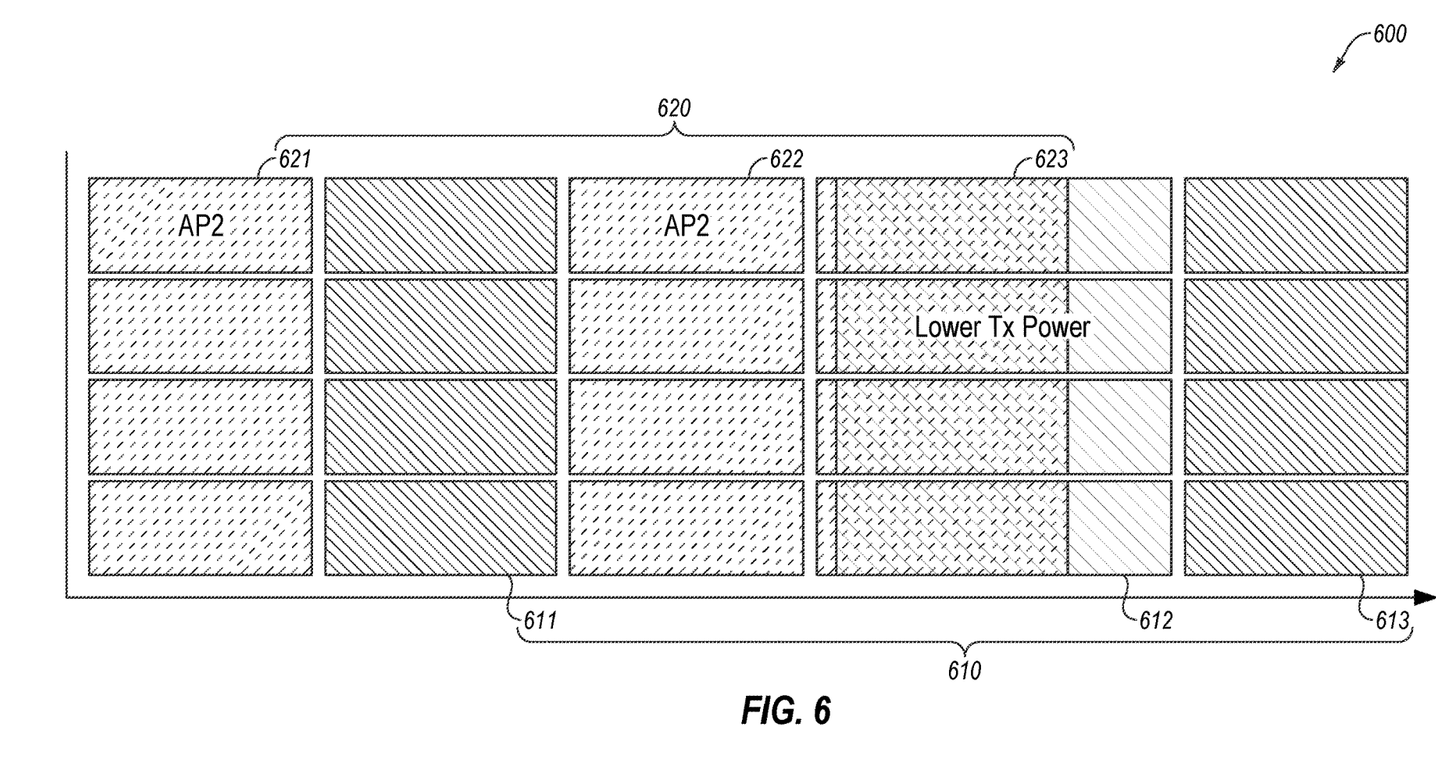
FIG. 6 is a plot of frequency sub-bands over time depicting an additional example usage of medium-based transmission parameter adaptation.

FIG. 6 is a plot 600 of frequency sub-bands over time depicting an additional example usage of medium-based transmission parameter adaptation, in accordance with one or more embodiments of the present disclosure. As illustrated in FIG. 6, the AP1 may be communicating with a station with in the 80 MHz bandwidth, and the AP2 (and/or other APs) may be transmitting through the entire 80 MHz bandwidth, but at a level close to (or even slightly above) the spatial reuse threshold. For example, as illustrated in FIG. 6, the AP2 may send transmissions 620, including the transmissions 621, 622, and 623.

The transmit scheduler may identify multiple potential options for transmitting packets to the station. First, the AP1 may maintain the current packet transmission mode (e.g., a full 80 MHz bandwidth), which would require waiting until the entire 80 MHz bandwidth is available. Second, the AP1 may reduce the transmit power based on spatial reuse, which may be used immediately.

As illustrated in FIG. 6, the transmit scheduler may select a particular option for each packet as it comes to the front of the queue for transmission. For example, a first packet may be transmitted via the transmission 611 using the first option by waiting until the full 80 MHz bandwidth is available. Continuing the example, a second packet may be transmitted via the transmission 612 using the full 80 MHz bandwidth at a reduced transmission power such that it may be sent sooner. In some embodiments, the selection of the first option instead of the second option may be selected based on previous successes in transmitting packets to the station involved. For example, if the station had repeatedly successfully received packets at a reduced bandwidth, the transmit scheduler may more readily select the second option, while if there is a history of failure in receiving packets at a reduced transmit power, the first option may be selected. In some embodiments, even if the RSSI of the AP2 is close to or even slightly over the spatial reuse threshold, the transmit scheduler may select the second option if there has been a high success rate at the reduced power transmission.

Figure 7:
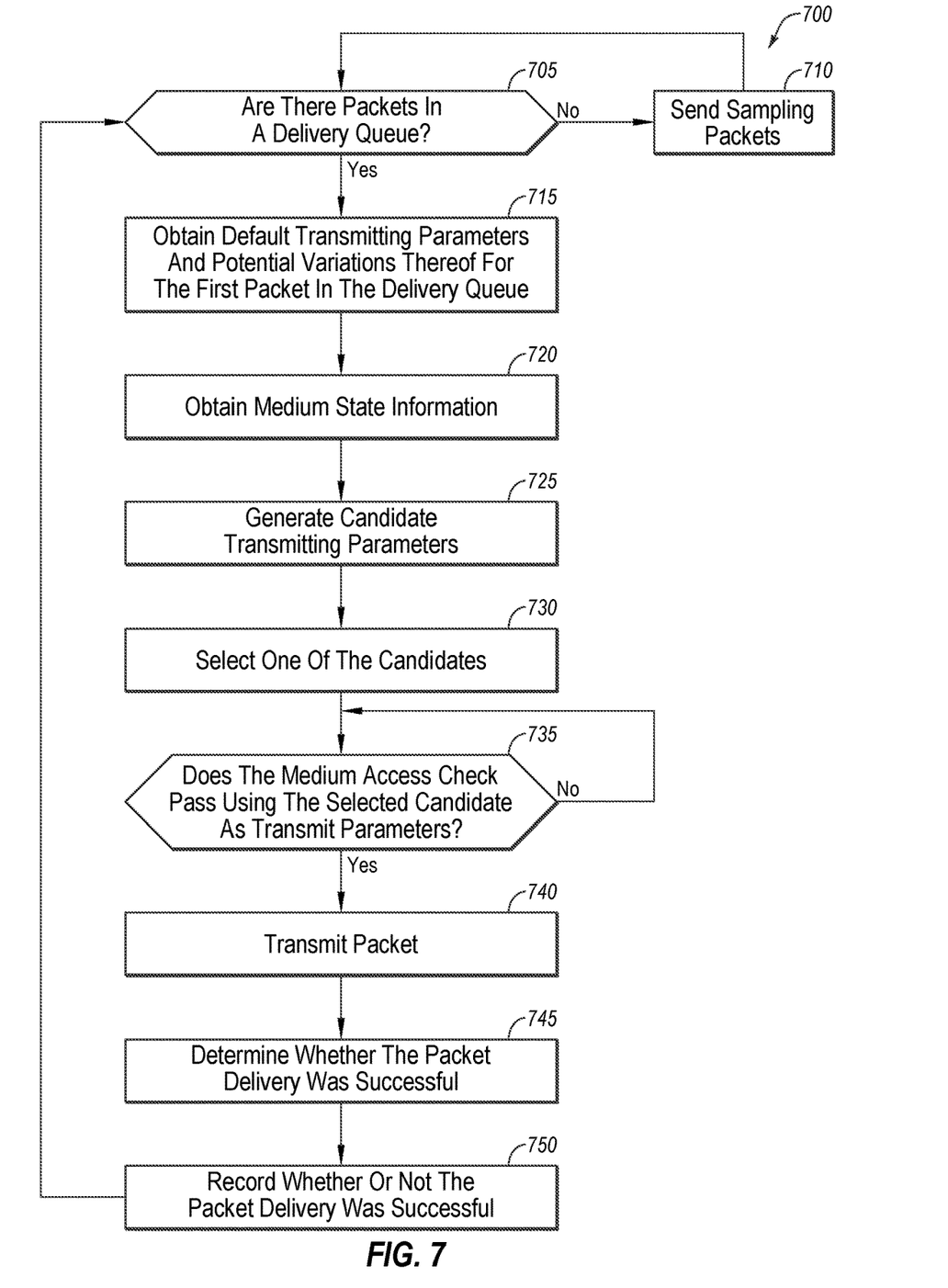
FIG. 7 is a flowchart of an example method of medium-based transmission parameter adaptation.

FIG. 7 is a flowchart of an example method 700 of medium-based transmission parameter adaptation, in accordance with one or more embodiments of the present disclosure. The method 700 may be implemented, in whole or in part, by one or more of the APs 120; the STAs 131, 132, 133, 136, the system 200, and/or the transmit scheduler 210 of FIGS. 1 and 2, respectively, or any combinations thereof.

At block 705, a determination may be made as to whether or not there are packets in a delivery queue to be transmitted. For example, an AP with a transmission scheduler (such as the transmit scheduler 210 of FIG. 2) may determine if there are any packets in the delivery queue. If there are no packets in the queue, the method 700 may proceed to the block 710. If there are packets in the queue, the method 700 may proceed to the block 715.

At block 710, sampling packets may be sent to one or more devices. For example, while an AP is quiet with no packets in the queue, the AP may send sampling packets to bolster the repository of successes/failures for a learning engine of a transmit scheduler. In some embodiments, the sampling packets may be sent using a set of transmitting parameters that may have a high risk of being unsuccessful, but may increase throughput significantly. For example, the sampling packets may include low transmission power packets such that the transmit scheduler may have information from which it may detect whether or not a particular station has been successful at receiving low transmit power packets. In these and other embodiments, when sending sampling packets, the AP may record whether or not the sampling packets were successfully received. After sending sampling packets at block 710, the method 700 may return to the block 705 to determine if there are packets in the delivery queue. In such a way, the transmit scheduler may build up a more robust profile of transmission success or failure.

At block 715, default transmitting parameters and potential variations thereof may be obtained for the first packet in the delivery queue. For example, a transmit scheduler may obtain device default parameters, session default parameters, etc. for the first packet in the queue. Additionally, the potential variations thereof may be obtained, such as by the transmit scheduler deriving the potential variations of the default transmitting parameters. In some embodiments, such variations may be based on the capabilities of the AP and/or the station (e.g., whether the AP and/or the station is able to support sub-band puncturing or spatial reuse). In some embodiments, the variations may be based on the type of packet. For example, for ACK, block acknowledgment (BAK), and/or clear to send (CTS) frames, a lower power transmission may not be available.

At block 720, medium state information may be obtained. For example, CCA-CS, CCA-ED, NAV, RSSI or other information may be obtained from which a state of the medium currently and/or in the future may be obtained. In some embodiments the current state may include determining whether an observed packet is an inter-BSS or intra-BSS packet, which may affect the medium availability for reduced power transmission.

At block 725, a set of candidate transmitting parameters may be generated. For example, the set of potential variations of the default transmitting parameters as compared to the current and/or future state of the medium may inform the generation of the set of candidate transmitting parameters. For example, if the current state of the medium includes a busy sub-band, the set of candidate transmitting parameters may include transmitting parameters that may transmit around or through the busy sub-band, or may wait until the sub-band is no longer busy.

At block 730, one of the candidates may be selected. For example, a decision core of the transmission scheduler may select a candidate that will increase throughput and have a high success rate. In some embodiments, the candidate with the highest throughput, including accounting for success rate, may be selected. In some embodiments, the selected candidate may include the default transmitting parameters. In some embodiments, the historical success or failure of transmission parameters may be considered when selecting one of the candidates. In some embodiments, the selection may be based on an ordering that may account for likelihood of success, increase in throughput, overall efficiency gains, etc. If placed in such an order, the candidates may be selected and tried in the order set based on such factors.

At block 735, a medium access check may be performed using the selected transmitting parameters to determine whether the medium is available using the selected transmitting parameters. If the medium is not accessible, the method 700 may wait a certain time and perform the media access check again. Additionally or alternatively, the method 700 may proceed to the block 737 to check whether all of the candidates have been exhausted, e.g., used to attempt to transmit the packet. If not all of the candidates have been exhausted, the method 700 may return to the block 730 to pick the next candidate transmitting parameters from the set of candidates. If all candidates have been exhausted, the method 700 may return to the block 720 to obtain current medium state information and regenerate a different set of transmitting parameter candidates. If the medium is accessible, the method may proceed to the block 740.

At block 740, the packet (e.g., the packet that was the front of the transmitting queue at the block 705) may be transmitted using the selected transmitting parameters.

At block 745, a determination may be made whether or not the packet was successfully delivered. For example, the AP may monitor for an ACK transmission in response to the transmission at the block 740. Additionally or alternatively, a timer may be monitored for the elapse of the timer before an ACK is received.

At block 750, whether or not the packet delivery was successful may be recorded. For example, a learning engine of the transmit scheduler may store a history of success rates and/or failure rates for certain sets of transmitting parameters. In some embodiments, the recorded success rates may include additional information, including which station was receiving the packet, the size of the packet, etc. In some embodiments, the recording of success rates of packets may also be performed for sampling packets, such as those sent in conjunction with the block 710. After block 750, the method 700 may return to the block 705 to determine if an additional packet is in the transmission queue to be transmitted. In some embodiments, the recording of success rates of packets may be utilized in other operations of the method 700, such as at block 725 and/or 730.

One skilled in the art will appreciate that, for this and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

FIG. 8 illustrates an example computing system 800 associated with remote management of a wireless sniffer, according to at least one embodiment described in the present disclosure. The computing system 800 may include a processor 810, a memory 820, a data storage 830, and/or a communication unit 840, which all may be communicatively coupled. Any or all of the APs and/or STAs of FIG. 1, and/or the system 200 and/or the transmit scheduler 210 of FIG. 2 may be implemented by a computing system consistent with the computing system 800. Additionally or alternatively, any of the operations of the method 700 of FIG. 7 may be performed by a computing system consistent with the computing system 800. For example, the computing system 800 may intelligently select a candidate set of transmitting parameters from multiple candidates.

Generally, the processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of network or physical locations that are configured to perform individually or collectively any number of operations described in the present disclosure. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory After the program instructions are loaded into the memory 820, the processor 810 may execute the program instructions, such as instructions to perform any of the operations of the method 700 of FIG. 7.

The memory 820 and the data storage 830 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 810. In some embodiments, the computing system 800 may or may not include either of the memory 820 and the data storage 830.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 840 may include any component, device, system, or combination thereof that is configured to transmit or receive information over a network. In some embodiments, the communication unit 840 may communicate with other devices at other locations, the same location, or even other components within the same system. For example, the communication unit 840 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a Wi-Fi device, a Wi-Max device, cellular communication facilities, or others), and/or the like. The communication unit 840 may permit data to be exchanged with a network and/or any other devices or systems described in the present disclosure. For example, the communication unit 840 may allow the system 800 to communicate with other systems, such as computing devices and/or other networks.

One skilled in the art, after reviewing this disclosure, may recognize that modifications, additions, or omissions may be made to the system 800 without departing from the scope of the present disclosure. For example, the system 800 may include more or fewer components than those explicitly illustrated and described.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

Unless specific arrangements described herein are mutually exclusive with one another, the various implementations described herein can be combined to enhance system functionality and/or to produce complementary functions. Such combinations will be readily appreciated by those skilled in the art given the totality of the foregoing description. Likewise, aspects of the implementations may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will, therefore, be appreciated that the above description has been given by way of example only and that modification in detail may be made within the scope of the present invention.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" or "an implementation" does not imply that such embodiment or implementation is essential to the subject technology or that such embodiment or implementation applies to all configurations of the subject technology. A disclosure relating to an embodiment or implementation may apply to all embodiments or implementations, or one or more embodiments or implementations. An embodiment or implementation may provide one or more examples of the disclosure. A phrase such as "an embodiment" or "an implementation" may refer to one or more embodiments or implementations and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed herein is intended to be dedicated to the public regardless of whether such disclosure is explicitly recited in the above description.

The present disclosure is not to be limited in terms of the particular implementations described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various implementations of the present disclosure have been described herein for purposes of illustration, and various modifications may be made without departing from the scope and spirit of the present disclosure. Accordingly, the various implementations disclosed herein are not intended to be limiting.

What is claimed is:

1. A method comprising:
   obtaining default transmitting parameters and potential variations of the default transmitting parameters for a packet to be transmitted over a wireless network;
   obtaining medium state information for a medium of the wireless network;
   generating a first candidate of transmitting parameters and a second candidate of transmitting parameters based on the medium state information, each of the first and second candidates of transmitting parameters consistent with at least one of the default transmitting parameters and the potential variations of the default transmitting parameters; and
   selecting from among the first and the second candidates of transmitting parameters to use when transmitting the packet over the wireless network.

2. The method of claim 1, further comprising:
   after transmitting the packet over the wireless network, recording whether or not the packet was successfully delivered using the first candidate of transmitting parameters;
   obtaining second default transmitting parameters and potential variations of the second default transmitting parameters for a second packet to be transmitted over the wireless network;
   obtaining updated medium state information of the wireless network;
   generating a third candidate of transmitting parameters and a fourth candidate of transmitting parameters based on the medium state information, each of the third and fourth candidates of transmitting parameters consistent with at least one of the second default transmitting parameters and the potential variations of the second default transmitting parameters;
   ordering the third and fourth candidates of transmitting parameters based on historical success rates of packet delivery over the wireless network; and
   selecting from among the third and the fourth candidates of transmitting parameters to use when transmitting the second packet over the wireless network based at least on the recording of whether or not the packet was successfully delivered using the first candidate of transmitting parameters.

3. The method of claim 1, wherein the each candidate set of transmission parameters includes a frequency bandwidth of transmission, use of one or more punctured sub bands in the bandwidth, a transmission power, a packet modulation and coding scheme (MCS) level, a request-to-send or clear-to-send (RTS-CTS) setting, and a packet length.

4. The method of claim 1, further comprising sending sampling packets, when no packets are queued for transmission, using various transmitting parameters to acquire additional data to record of whether or not the sampling packets were successfully delivered using the various transmitting parameters.

5. The method of claim 4, wherein at least one of the various transmitting parameters include a set of transmitting parameters with a higher potential throughput but a higher risk of failure of delivery than the default transmitting parameters.

6. The method of claim 1, wherein obtaining medium state information comprises obtaining current state information of the medium by operations comprising:
   obtaining clear channel assessment-carrier sense (CCA-CS) information by analyzing a preamble of a Wi-Fi packet that is utilizing the medium and that is received at a power above a first threshold level, the preamble permitting determination of a duration for which the medium is occupied; and
   obtaining clear channel assessment-energy detect (CCA-ED) information of energy detected at a power above a second threshold level.

7. The method of claim 6, wherein obtaining the current state information of the medium further comprises:
   determining whether an observed packet is an inter-basic service set (inter-BSS) packet or an intra-BSS packet; and
   determining whether the observed packet includes an acknowledgment (ACK), block acknowledgment (BA), or clear to send (CTS) frame;
   wherein the first candidate includes parameters for a spatial reuse transmission with a backed-off transmission power and in a same bandwidth as the observed packet based on the observed packet being an inter-BSS packet and not including the ACK, BA or CTS frame.

8. The method of claim 1, wherein obtaining medium state information comprises obtaining future state information of the medium by determining network allocation vector (NAV) information for sub-bands of the medium.

9. One or more non-transitory computer-readable media containing instructions which, in response to being executed by a processor, cause a system to perform operations comprising:
obtaining default transmitting parameters and potential variations of the default transmitting parameters for a packet to be transmitted over a wireless network;
obtaining medium state information for a medium of the wireless network;
generating a first candidate of transmitting parameters and a second candidate of transmitting parameters based on the medium state information, each of the first and second candidates of transmitting parameters consistent with at least one of the default transmitting parameters and the potential variations of the default transmitting parameters; and
selecting from among the first and the second candidates of transmitting parameters to use when transmitting the packet over the wireless network.

10. The non-transitory computer-readable media of claim 9, wherein the operations further comprise:
after transmitting the packet over the wireless network, recording whether or not the packet was successfully delivered using the first candidate of transmitting parameters;
obtaining second default transmitting parameters and potential variations of the second default transmitting parameters for a second packet to be transmitted over the wireless network;
obtaining updated medium state information of the wireless network;
generating a third candidate of transmitting parameters and a fourth candidate of transmitting parameters based on the medium state information, each of the third and fourth candidates of transmitting parameters consistent with at least one of the second default transmitting parameters and the potential variations of the second default transmitting parameters;
ordering the third and fourth candidates of transmitting parameters based on historical success rates of packet delivery over the wireless network; and
selecting from among the third and the fourth candidates of transmitting parameters to use when transmitting the second packet over the wireless network based at least on the recording of whether or not the packet was successfully delivered using the first candidate of transmitting parameters.

11. The non-transitory computer-readable media of claim 9, wherein the first candidate includes a frequency bandwidth of transmission, a transmission power, a packet modulation and coding scheme (MCS) level, and a packet length.

12. The non-transitory computer-readable media of claim 9, the operations further comprising sending sampling packets, when no packets are queued for transmission, using various transmitting parameters to acquire additional data to record of whether or not the sampling packets were successfully delivered using the various transmitting parameters.

13. The non-transitory computer-readable media of claim 12, wherein at least one of the various transmitting parameters include a set of transmitting parameters with a higher potential throughput but a higher risk of failure of delivery than the default transmitting parameters.

14. The non-transitory computer-readable media of claim 9, wherein obtaining medium state information comprises obtaining current state information of the medium by operations comprising:
obtaining clear channel assessment-carrier sense (CCA-CS) information by analyzing a preamble of a Wi-Fi packet that is utilizing the medium and that is received at a power above a first threshold level, the preamble permitting determination of a duration for which the medium is occupied; and
obtaining clear channel assessment-energy detect (CCA-ED) information of energy detected at a power above a second threshold level.

15. The non-transitory computer-readable media of claim 14, wherein obtaining the current state information of the medium further comprises:
determining whether an observed packet is an inter-basic service set (inter-BSS) packet or an intra-BSS packet; and
determining whether the observed packet includes an acknowledgment (ACK), block acknowledgment (BA), or clear to send (CTS) frame;
wherein the first candidate includes parameters for a spatial reuse transmission with a backed-off transmission power and in a same bandwidth as the observed packet based on the observed packet being an inter-BSS packet and not including the ACK, BA or CTS frame.

16. The non-transitory computer-readable media of claim 9, wherein obtaining medium state information comprises obtaining future state information of the medium by determining network allocation vector (NAV) information for sub-bands of the medium.

17. A system comprising:
one or more processors; and
one or more non-transitory computer-readable media containing instructions which, in response to being executed by the one or more processors, cause the system to perform operations comprising:
obtaining default transmitting parameters and potential variations of the default transmitting parameters for a packet to be transmitted over a wireless network;
obtaining medium state information for a medium of the wireless network;
generating a first candidate of transmitting parameters and a second candidate of transmitting parameters based on the medium state information, each of the first and second candidates of transmitting parameters consistent with at least one of the default transmitting parameters and the potential variations of the default transmitting parameters;
ordering the third and fourth candidates of transmitting parameters based on historical success rates of packet delivery over the wireless network; and
selecting from among the first and the second candidates of transmitting parameters to use when transmitting the packet over the wireless network.

18. The system of claim 17, wherein the operations further comprise:
after transmitting the packet over the wireless network, recording whether or not the packet was successfully delivered using the first candidate of transmitting parameters;
obtaining second default transmitting parameters and potential variations of the second default transmitting parameters for a second packet to be transmitted over the wireless network;

obtaining updated medium state information of the wireless network; and generating a third candidate of transmitting parameters and a fourth candidate of transmitting parameters based on the medium state information, each of the third and fourth candidates of transmitting parameters consistent with at least one of the second default transmitting parameters and the potential variations of the second default transmitting parameters; and selecting from among the third and the fourth candidates of transmitting parameters to use when transmitting the second packet over the wireless network based at least on the recording of whether or not the packet was successfully delivered using the first candidate of transmitting parameters.

19. The system of claim 17, the operations further comprising sending sampling packets, when no packets are queued for transmission, using various transmitting parameters to acquire additional data to record of whether or not the sampling packets were successfully delivered using the various transmitting parameters.

20. The system of claim 17, wherein obtaining medium state information comprises:

obtaining current state information of the medium by operations comprising:

obtaining clear channel assessment-carrier sense (CCA-CS) information by analyzing a preamble of a Wi-Fi packet that is utilizing the medium and that is received at a power above a first threshold level, the preamble permitting determination of a duration for which the medium is occupied; and obtaining clear channel assessment-energy detect (CCA-ED) information of energy detected at a power above a second threshold level;

determining whether an observed packet is an inter-basic service set (inter-BSS) packet or an intra-BSS packet; and determining whether the observed packet includes an acknowledgment (ACK), block acknowledgment (BA), or clear to send (CTS) frame; and obtaining future state information of the medium by determining network allocation vector (NAV) information for sub-bands of the medium;

wherein the first candidate includes parameters for a spatial reuse transmission with a backed-off transmission power and in a same bandwidth as the observed packet based on the observed packet being an inter-BSS packet and not including the ACK, BA or CTS frame.

\* \* \* \* \*